United States Patent

[11] 3,566,743

[72] Inventor  Millard M. Frohock, Jr.
              Thousand Oaks, Calif.
[21] Appl. No. 754,408
[22] Filed     Aug. 21, 1968
[45] Patented  Mar. 2, 1971
[73] Assignee  Hughes Aircraft Company
              Culver City, Calif.

[54] KINEMATIC DEVICE FOR FIRE CONTROL AGAINST TERRESTRIAL TARGETS WITH SINGLE RATE SENSOR
5 Claims, 1 Drawing Fig.

[52] U.S. Cl. .................................................... 89/41
[51] Int. Cl. .................................................... F41g 5/16, F41g 1/00, F41g 3/10
[50] Field of Search .......................................... 89/41.6, 41.7

[56]                References Cited
              UNITED STATES PATENTS
2,586,817  2/1952  Harris, Jr. .................  89/41
2,968,997  1/1961  Newton, Jr. et al. ............  89/41
3,019,711  2/1962  Bailey et al. ................  89/41
3,443,476  5/1969  Heider et al. ................  89/41

Primary Examiner—Samuel Feinberg
Assistant Examiner—Thomas H. Webb
Attorneys—James K. Haskell and Allen A. Dickey, Jr.

ABSTRACT: In gun pointing a gun platform is driven by a tracker, but especially in military tanks, the gun platform is rarely horizontal. Accordingly, an elevational correction is necessary in addition to an azimuthal correction to lead a substantially horizontally moving target. The present device uses a single rate sensor to sense the azimuthal rate of the gun platform and a gravity sensor to detect the angle by which the gun platform is off of horizontal. The gravity sensor takes the form of a resolver which accepts the rate information to provide elevational and azimuthal gun pointing correction on such targets.

INVENTOR.
MILLARD M. FROHOCK, JR.
BY
Allen A. Dicke, Jr.,
AGENT.

KINEMATIC DEVICE FOR FIRE CONTROL AGAINST TERRESTRIAL TARGETS WITH SINGLE RATE SENSOR

BACKGROUND

This invention is directed to a kinematic lead angle mechanization for fire control against terrestrial targets which employs a single rate sensor.

The problem or proper gun aiming against a substantially horizontally moving terrestrial target, because of angularity of the gun platform with respect to a plane normal to gravity has been recognized. Previous devices employ a horizontal rate sensor for making azimuthal lead angle corrections, and a separate elevational rate sensor to detect angular rate of the line of sight in a plane normal to the plane of the gun platform for making elevation corrections. However, the departure of the gun platform from horizontal is usually slight so that the elevational signal is so small that noise signal from the elevational rate signal detector is often more than the desired signal. Accordingly, elevational corrections have not been properly or correctly made.

SUMMARY

In order to aid in the understanding of this invention, it can be stated in essentially summary form that it is directed to a kinematic lead angle mechanization for fire control against terrestrial targets which employs a single rate sensor. The rate sensor measures the azimuthal rate of the gun platform, when the platform follows (tracks) a horizontally moving target, and an angle detector determines the angular displacement of the gun platform from the horizontal. The rate and the angle are combined in a resolver to provide substantially correct values of target angular rate in the azimuthal and elevational directions.

Accordingly, it is an object of this invention to provide a kinematic mechanization for fire control against terrestrial targets which employs a single rate sensor. It is another object to provide a single gyroscopic rate sensor on a gun platform. It is a further object to provide means to sense the vertical direction, with respect to the gun platform so that the angular deviation of the platform from a plane perpendicular to the vertical is established. It is a further object to combine the rate sensor signal with the angular signal to evolve signals for directing the gun with respect to the line of sight so that proper azimuthal and elevational corrections are made to correct for target motion. Other objects and advantages of this invention will become apparent from a study of the following portion of the specification, the claims and the attached drawings.

DESCRIPTION

Figure 1:
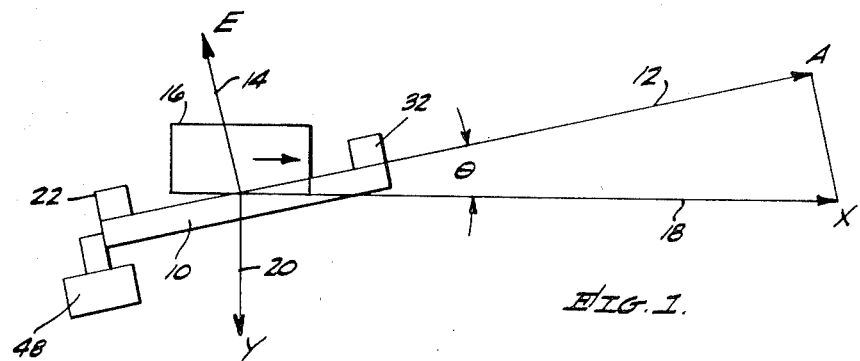
FIG. 1 is a diagrammatic view showing an example of the angular relationship of the parts.

Referring to FIG. 1, the movable portion of a gun platform is illustrated at 10. It is, for example, a tank turret or is the gun mount portion that azimuthly in a field piece. A gun (not shown), which is mounted upon the gun platform 10, is arranged such that it can rotate about an axis in the plane of the platform 10, that is in the elevational direction. The azimuthal direction is illustrated at 12 while the elevational direction is illustrated at 14. A line of sight tracker (not shown) drives the platform 10 in the azimuthal direction, with respect to its base, and drives the gun elevationally with respect to the gun platform 10. Any convenient tracker can be employed, such as optical, infrared, radar and the like.

Target 16 is a moving target and it is assumed that it is moving on level or substantially level ground. The direction of motion of target 16 is illustrated at 18. The line 18 along which the target moves is perpendicular to the gravitational direction 20. The assumption that the target moves along a horizontal line is justified because large terrestrial vehicles can move up and down grades only at slow rates, and high velocities are accomplished only on horizontal or substantially horizontal terrain. Waterborne vehicles are confined to the water surface.

From FIG. 1, it is seen that the plane of gun platform 10 is not horizontal. When a gun is mounted upon an artillery piece, helicopter, ship or tank, the gun platform departs from the target plane defined by the line of motion of the target 18 and the center of the gun platform by an angle $\Theta$. Thus, elevational correction as well as azimuthal correction must be made to lead a moving target. This invention provides the necessary structure to provide sufficiently accurate lead signals from a single rate sensing structure. Rate sensor 22 is mounted upon gun platform 10 to measure the rate of rotation of the gun platform in the azimuthal direction. Making the assumption that the angular rate in the azimuthal plane is equal to the angular rate in the target plane, which is nearly true for small values of the angle $\Theta$, then the angular rate of the target in both the azimuthal and elevational directions can be calculated, as is shown in the following equations 1 and 2:

$W_A = W_T(\cos\Theta) \cong W_A(\cos\Theta$
$W_E = W_T(-\sin\Theta) \cong W(-\sin\kappa$ where:
$W_T =$ angular rate of the target in the target plane
$W_A =$ angular rate in the azimuthal direction
$W_E =$ angular rate in the elevational direction In properly directing the gun, the total lead angle, the amount the gun must lead the target when the target is moving, is equal to the angular rate times the time of flight of the projectile, as is given in the following formulas 3 and 4:
where:

$L_A = W_A t$ (3)
$L_E = W_E t$ (4)
$L_{LA} =$ lead angle in the azimuthal direction
$L_E =$ lead angle in the elevational direction
$t =$ time of flight of the projectile Here it is assumed that the amount of lead in the azimuthal direction is equal to the amount of lead in the target plane. Of course, this is an approximation, but for small angles it is sufficiently correct.

Figure 2:
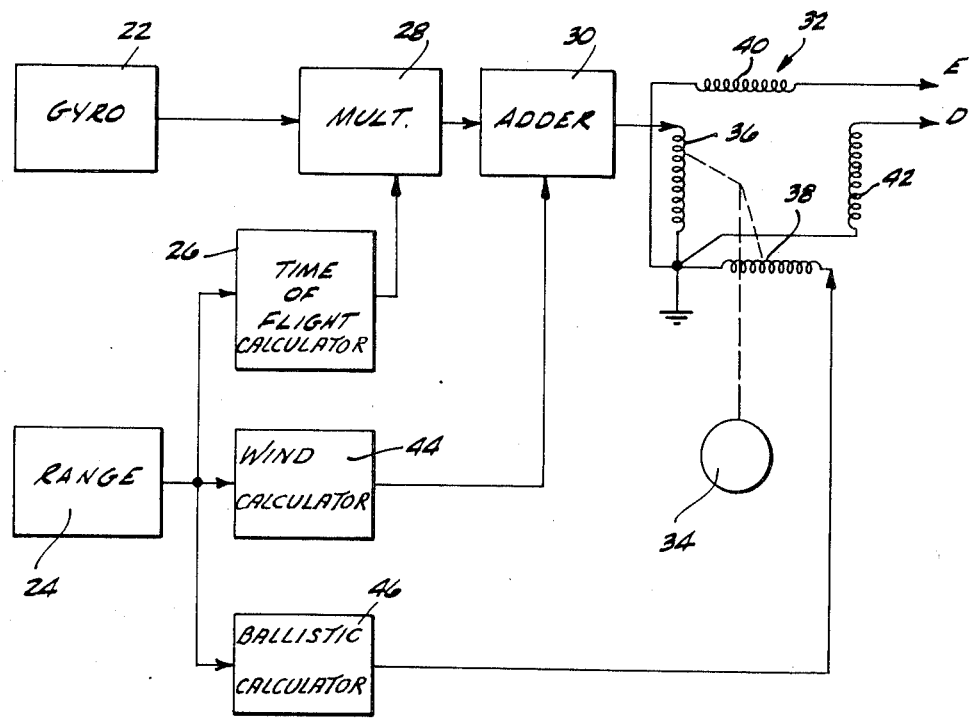
FIG. 2 is a schematic block diagram showing a mechanization for kinematic angle correction for fire control against terrestrial targets employing a single rate sensor.

Referring to FIG. 2, a preferred mechanization of the present kinematic lead angle device for fire control against terrestrial targets with a single rate sensor is illustrated. In FIG. 2, rate sensor 22 is illustrated as being a gyroscope, but it is clear that other rate sensors can be employed. Range is directly determined by range finder 24 by an conventional means. From range, and ballistic information, the time of flight $t$ of the projectile is calculated in calculator 26. The time of flight is multiplied times the angular rate $W_A$ in multiplier 28 so that the output of the multiplier is $W_A t$.

Neglecting adder 30 for the moment, the $W_A t$ signal is fed into gravity sensor 32. Gravity sensor 32 is a resolver mounted on a platform 10 and having a pendulum 34 which is maintained in a direction parallel to the gravitational field. Pendulum 34 is connected to movable armature coils 36 and 38. The effect of the gravitational sensing resolver 32 is to multiply by the appropriate functions of the angle $\Theta$. Adder 30 is connected to armature coil 36, so that the outputs of the stator coils 40 and 42 are in accordance with formulas 5 and 6 below:

$L_A \cong W_A (\cos\Theta) t$ (5)
$L_E \cong W_A(-\sin\Theta)$ (6)

In addition to the azimuthal and elevational lead necessary to have the projectile strike a moving target, ballistic and wind corrections must be made to gun pointing because of trajectory considerations. Thus, in addition to the $L_A$ and $L_E$ values resulting from resolver 32, other factors are also present in the output. Appropriate ballistic values are placed a ballistic calculator 46, in accordance with the characteristics of the round being fired, to develop a ballistic correction B to account for the difference between the ballistic trajectory nd and the line of sight. This is a vertical correction. Similarly, windage information is placed into wind calculator 44 to provide a windage or horizontal correction N due to wind. The output of wind calculator 44 goes to adder 30, while the output of ballistic calculator 46 goes to coil 38. Of course, both the ballistic corrections and windage corrections must be corrected in terms of the gun platform angle Θ. The total corrections are shown in the following formulas 7 and 8:

$$D = B \sin \Theta + (N + W_A t) \cos \Theta \quad (7)$$
$$E = B \cos \Theta - (N + W_A t) \sin \Theta \quad (8)$$

where:

$D$ is the value substantially corresponding to the angle in the platform plane between the line of sight to the target and the direction of gun pointing for a strike on the moving target as the platform is driven by platform rotator 48.

$E$ is the value substantially corresponding to the angle in a plane normal to the platform plane between the line of sight to the target and the direction of gun pointing for strike on the moving target.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

I claim:

1. A kinematic device utilizing the local gravity vector and the horizontal plane normal to the local gravity vector for the determination of the angular rate of rotation in azimuthal and elevational directions to a target of a platform rotatable about an axis and having a platform plane therethrough normal to the axis of rotation, said device comprising:

a single angular rate sensor mounted on said platform for providing a signal proportional to the angular rate of rotation of said platform around its axis;

vertical sensor means mounted on said platform for providing a signal indicating angular orientation of said platform with respect to the horizontal plane;

resolver means connected to said rate sensor; and said resolver means including a movable portion coupled to said vertical sensor means, said resolver means resolving signals from said rate sensor and said vertical sensor means so that said resolver means emits a first signal corresponding to the angular rate of rotation of said platform in the azimuthal direction and a second signal corresponding to the angular rate of said platform in a plane normal to the plane of said platform as said platform is rotated.

2. The device of claim 1 wherein said platform is a gun platform, with a gun rotatable in an azimuthal direction with said platform in said platform plane and being rotatable in an elevational direction in an elevational plane normal to said plane of said platform, said resolver means emitting a signal proportional to the angular rate of said gun platform in the azimuthal direction times a function of the angle between said platform plane and said horizontal plane for azimuthal correction of gun pointing and emitting a signal corresponding to the angular rate of aid gun platform times another function of said angle between said platform plane and said horizontal plane for elevational correction of gun pointing.

3. A kinematic device for fire control against terrestrial targets, said device comprising:

a gun platform having a platform plane and means to rotate said platform about an axis normal to said platform plane, said gun platform being adapted to carry a gun elevatable in a direction normal to said platform plane;

a single rate sensor mounted on said platform, said rate sensor sensing angular rotation of said platform about its axis and emitting a signal proportional to the rate of rotation of said platform about its axis;

angular detecting means mounted on said platform for detecting the angular difference between the axis of rotation of said platform and the gravitational direction; and said rate sensor being coupled to said angular detecting means so that said angular detecting means emits a signal proportional to the angular rate of said platform about its axis times a function of the angle between said platform axis and the gravitational direction and a signal proportional to the angular rate of said platform about its axis times another function of the angle between said platform axis and the gravitational direction, the signals emitted form said angular detecting means being employed for gun pointing correction.

4. The device of claim 3 further including first means for calculating time of flight of a projectile from said gun to a selected target and second means coupled to said first means, rate sensor and angular detecting means for multiplying the time of flight of the projectile times the angular rate of rotation of said gun platform to develop a product signal, wherein said angular detecting means is a resolver, said resolver being responsive to the product signal from said second means for emitting a signal substantially corresponding to azimuthal lead correction and a signal substantially corresponding to elevational lead correction.

5. A single sensor kinematic device for fire control against substantially horizontally moving targets, said device comprising:

a platform, said platform being rotatable on an axis and having an azimuthal plane normal to the platform axis, drive means to rotate said platform in its plane on its axis, drive means to rotate said platform in its plane on its axis, said platform being a gun platform, a gun mounted on said platform for rotation with said platform in the azimuthal plane, said gun being mounted on said platform for rotation in an elevational plane normal to said azimuthal plane;

angular rate sensing means mounted on said platform, said angular rate sensing means sensing and emitting a signal proportional to the angular rate of rotation of said platform about its axis;

verticality sensing means mounted on said platform for sensing the angle between said azimuthal plane and a horizontal plane;

range sensing means for determining the range between said platform and a target;

time of flight calculating means connected to said range sensing means for emitting a signal proportional to the time of flight of a projectile from said gun to the target;

multiplying means coupled to said angular rate sensing means and to said time of flight calculating means for multiplying the time of flight signal times the angular rate signal to produce a product signal; and resolver means coupled to said multiplying means and said vertically sensing means and being responsive to the product signal for producing a signal proportional to azimuthal gun lead angle and a signal proportional to elevational gun lead angle.

PO-1050
(5/69)

UNITED STATES PATENT OFFICE
CERTIFICATE OF CORRECTION

Patent No. 3,566,743    Dated March 2, 1971

Inventor(s) Millard M. Frohock, Jr.

It is certified that error appears in the above-identified patent and that said Letters Patent are hereby corrected as shown below:

Col. 1, line 64, after "that" and before "azimuthly" insert --swings--.

Col. 2, line 25, $W_A = W_T (\cos \theta) \cong W_A (\cos \theta$   should be $$--W_A = W_T (\cos \theta) \cong W_A (\cos \theta) \qquad (1)-$$

Col. 2, line 26, $W_E = W_T (-\sin\theta) \cong W (-\sin \kappa$   should be $$--W_E = W_T (-\sin \theta) \cong W_A (-\sin \theta) \qquad (2)-$$

Col. 2, line 35, delete "where".

Col. 2, lines 36 through 38, "$L_A = W_A t\,(3)$
$L_E = W_E t\,(4)$
$L_{LA}$ = lead angle in the azin direction"

should be
$$--L_A = W_A t \qquad (3)$$
$$L_E = W_E t \qquad (4)$$
where:
$L_A$ = lead angle in the azimut direction--

Col. 2, line 50, "an" should be --any--.
Col. 2, line 67, "$L_E \cong W_A (-\sin \theta) \qquad (6)$" should be
$$--L_E \cong W_A (-\sin \theta) t \qquad (6)--$$

Col. 2, line 73, after "placed" and before "a" insert --in-
Col. 3, line 1, "nd" should be --and--.
Col. 3, line 60, "aid" should be --said--.
Col. 4, line 19, "form" should be --from--.
Col. 4, line 37, delete "drive".
Col. 4, line 38, delete "means to rotate said platform in plane on its axis,".
Col. 4, line 61, "vertically" should be --verticality--.

Signed and sealed this 10th day of August 1971.

(SEAL)
Attest:

EDWARD M. FLETCHER, JR.
Attesting Officer

WILLIAM E. SCHUYLER, JR.
Commissioner of Patents